US012533573B2

(12) United States Patent
Whitcomb

(10) Patent No.: US 12,533,573 B2
(45) Date of Patent: Jan. 27, 2026

(54) DEVICES AND METHODS FOR A GAME CONTROLLER

(71) Applicant: Sony Interactive Entertainment LLC, San Mateo, CA (US)

(72) Inventor: Sean Whitcomb, Seattle, WA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 317 days.

(21) Appl. No.: 18/168,451

(22) Filed: Feb. 13, 2023

(65) Prior Publication Data

US 2024/0269548 A1 Aug. 15, 2024

(51) Int. Cl.

| | |
|---|---|
| ***A63F 13/213*** | (2014.01) |
| ***A63F 13/2145*** | (2014.01) |
| ***A63F 13/218*** | (2014.01) |
| ***A63F 13/22*** | (2014.01) |
| ***A63F 13/24*** | (2014.01) |
| ***A63F 13/79*** | (2014.01) |

(52) U.S. Cl.

CPC ............ *A63F 13/22* (2014.09); *A63F 13/213* (2014.09); *A63F 13/2145* (2014.09); *A63F 13/218* (2014.09); *A63F 13/24* (2014.09); *A63F 13/79* (2014.09)

(58) Field of Classification Search

None

See application file for complete search history.

(56) References Cited

U.S. PATENT DOCUMENTS

2008/0227546 A1 9/2008 Roberts et al.
2008/0303786 A1* 12/2008 Nakamura .......... G06F 3/04883 382/173
2013/0222273 A1* 8/2013 Tan ....................... A63F 13/285 345/173
2015/0135108 A1* 5/2015 Pope ..................... G06F 1/1671 715/767
2015/0234479 A1 8/2015 Schantz et al.
2021/0011604 A1 1/2021 Yoganandan et al.
2022/0291822 A1* 9/2022 Wheeler ............. G06F 3/04812

OTHER PUBLICATIONS

International Search Report dated May 10, 2024 in International Application No. PCT/US24/15573.
Written Opinion dated May 10, 2024 in International Application No. PCT/US24/15573.

* cited by examiner

*Primary Examiner* — Damon J Pierce
(74) *Attorney, Agent, or Firm* — Fish & Richardson P.C.

(57) ABSTRACT

Device and process configurations are provided for game controllers. A game controller can include an input control sensor having an input surface and at least one optical sensor to detect input to the input surface. The game controller can also include a controller coupled to the input control sensor to receive game controller input, identify at least one input command, and output a control signal. Input control sensors allow for input based on one or more of touch, tap, swipe, press, pinch and joystick inputs to one or more surfaces of the controller. Input can include a pretouch relative to the input surface, the pretouch including input approaching the input surface and input prior to engagement with a surface. A game controller can present at least one reference point for an input control including illumination and use of a touch screen to detect one or more of heat and pressure.

23 Claims, 7 Drawing Sheets

DEVICES AND METHODS FOR A GAME CONTROLLER

FIELD

The present disclosure is directed to sensing configurations and game controllers for electronic games, including controller configurations, gaming device controllers, gaming device controller operation, and interactive entertainment device configurations.

BACKGROUND

Computer and console games often utilize a controller or computer keypad as control interface for a user. These conventional controllers typically require a user to press buttons or control moveable elements to provide game controls. Often these controllers adhere to a similar control interface of having a directional pad on one side of the controller and buttons on the other side of the controller. One of the drawbacks of existing designs may be the fixed configuration. By way of example, a fixed layout may be too small, or too large, for a user. Similarly, a fixed layout may not be comfortable to a user. Manufacturers typically do not veer from layout or controller size to reduce cost. As result, controllers may include button configurations for hand sizes that do not accommodate all players. There exists a desire for game controllers to allow for different configurations, and accommodate hand sizes without having to customize or manufacture controller size.

Another drawback of conventional controllers may be the fixed nature of input controls. For example, a controller only has enough space to include a directional pad and joystick, and each element is usually located in a different location. Due to size of physical control elements, game controls may be limited. In addition, inclusion of controls can increase controller size. There exists a need and a desire to allow for improvements and modifications to game controllers.

BRIEF SUMMARY OF THE EMBODIMENTS

Disclosed and described herein are game controller devices, sensors and methods. In one embodiment, a game controller device includes a body, and at least one input control sensor supported by the body, wherein the at least one input control sensor includes an input surface and at least one optical sensor to detect game controller input to the input surface. The game controller device also includes a controller coupled to the at least one input control sensor. The controller is configured to receive game controller input to the input control sensor, identify at least one input command based on the input, and output a control signal based on the at least one input command.

In one embodiment, the at least one input control sensor is configured to detect at least one of touch, tap, swipe, press, pinch and joystick input.

In one embodiment, the at least one optical sensor is configured to detect input relative to at least one region of the input surface.

In one embodiment, the at least one optical sensor is configured to detect a pretouch relative to the input surface, wherein the pretouch is at least one of an input approaching at least one region of the input surface and an input prior to engagement with at least one region of the input surface.

In one embodiment, the input surface includes an optically transmissible surface.

In one embodiment, the controller identifies the at least one input command relative to at least one reference point of the control sensor.

In one embodiment, the controller is configured to present at least one reference point for an input control location.

In one embodiment, the controller is configured to detect input control locations based on at least one input reference update, wherein the input reference update is a user specified location for an input control location.

In one embodiment, the controller is configured to identify a user and configure the game controller based on user identification to include at least one input control location.

In one embodiment, the game controller device includes a memory coupled to the controller and configured to store executable instructions, wherein the memory is further configured to store at least one input control location.

In one embodiment, the game controller device includes at least one of a temperature sensor and pressure sensor configured to detect condition of the input surface.

Another embodiment is directed to an input control sensor for a game controller device. The input control sensor includes an input surface, at least one optical sensor to detect input to the input surface, and a controller coupled to the at least one optical sensor. The controller is configured to receive input to the input control sensor, identify at least one input command based on the input, and output a control signal based on the at least one input command.

In one embodiment, the at least one optical sensor is configured to detect at least one of touch, tap, swipe, press, pinch and joystick input.

In one embodiment, the at least one optical sensor is configured to detect input relative to at least one region of the input surface.

In one embodiment, the at least one optical sensor is configured to detect a pretouch relative to the input surface, wherein the pretouch is at least one of an input approaching at least one region of the input surface and an input prior to engagement with at least one region of the input surface In one embodiment, the input surface includes an optically transmissible surface.

In one embodiment, the controller identifies the at least one input command relative to at least one reference point of the control sensor.

In one embodiment, the controller is configured to present at least one reference point for an input control location.

In one embodiment, the controller is configured to detect input control locations based on at least one input reference update, wherein the input reference update is a user specified location for an input control location.

In one embodiment, the controller is configured to identify a user and configure a game controller based on user identification to include at least one input control location.

In one embodiment, the input control sensor includes a memory coupled to the controller, the memory configured to store executable instructions and to store at least one input control location.

In one embodiment, the input control sensor includes at least one of a temperature sensor and pressure sensor configured to detect condition of the input surface.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION OF THE EXEMPLARY EMBODIMENTS

Overview and Terminology

Figure 1A:
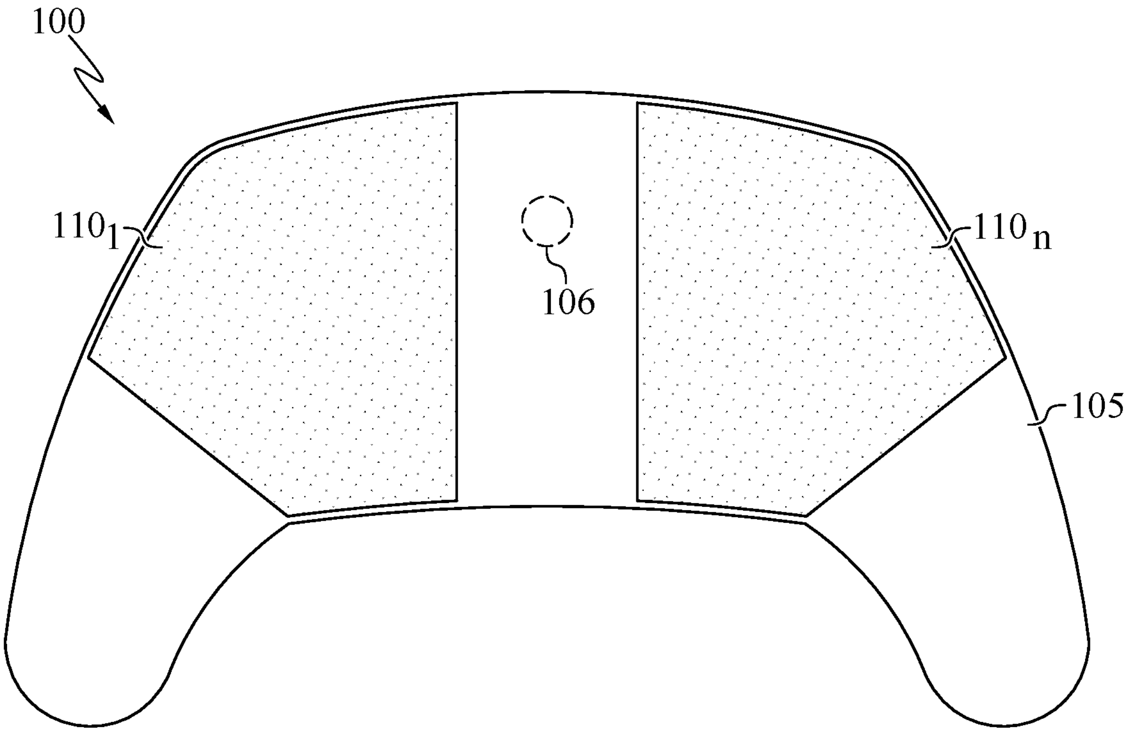
FIG. 1A is a graphical representation of a game controller device according to one or more embodiments.

One aspect of the disclosure is directed to game controller configurations and input devices for game controllers. Embodiments are directed to systems, devices and methods for detecting user input and outputting control signals to a gaming device or interactive entertainment device. Gaming systems may include consoles that play game media, consoles that provide network data for games, handheld devices, mobile devices (e.g., tablets, mobile phones, etc.) and devices in general configured for electronic gaming. A game controller device may be an independent or integrated device configured to provide user controls to the gaming system. According to embodiments, a game controller design is provided to include at least one input surface including at least one sensor to detect user input, such as touch, tap swipe, press, pinch and joystick controls. The game controller can include one or more input areas and one or more input control sensors. Unlike conventional game controllers with a fixed arrangement of physical buttons, input control locations may be selected and/or adjusted by a user.

According to embodiments, a buttonless game controller input configuration is provided. Configurations and input sensors are provided to allow for a game controller to include at least one input surface that does not require a button or joystick. Input surfaces of the controller may be configured to detect user touch and user inputs similar to activation of a button or manipulation of a directional pad without requiring actual push buttons or a directional pad. Game controller configurations can be used in addition to and/or independent from physical push buttons. According to embodiments, an input control sensor is provided to allow for buttonless operation by the game controller. The input control sensor can be used for game control and non-game applications.

Embodiments are also directed to input control sensors. According to embodiments, an input control sensor can include an input surface that may be supported by the body of a game controller or a housing in general. According to embodiments, one or more optical sensors may be used to detect user contact and interaction with the input surface. The input surface may eliminate the need for physical buttons and allow for a single surface to detect one or more of touch, tap, swipe, slide, press, pinch, etc. Unlike a conventional button that is configured to provide a single function in a single location, input control sensors described herein can allow for one or more input control locations to be provided on an input surface. In that fashion, traditional button functions may be provided by the input control sensor, in that a user may press or contact a location of the input surface such that the contact is identified as a button press. Similarly, one or more regions of an input surface may be associated with directions of a directional pad or joystick such that contact with the region may be interpreted as operation of a directional pad. The input control sensor may include or more input control locations. In addition, the input control sensor may allow a user to move to reposition input control locations. One benefit of repositioning input control locations is to accommodate different hand and/or finger sizes. Another benefit may be to allow for controller arrangement to be modified and/or inverted. By way of example, instead of only allowing a directional pad to be on the left side of the controller, the controller can be configured to allow for the right side of the controller to include the directional pad. Similarly, directional pad input locations of button locations may be placed more stretched apart or closer together. As such, the controller can offer players a personalized experience.

Input control sensors may be configured to operate using one or more optical sensors configured internally of the input control sensor. Optical control sensors can detect contact with an input surface. According to embodiments, optical control sensors may detect a user finger or hand approaching the input surface. By detecting contact, the input control sensors may detect the duration and movement of a user relative to the input surface to allow for detection of a press, or direction associated with a swipe or motion. Input control sensors may also detect pretouch of a user. Pretouch may be used to more accurately characterize multiple button presses. Input control sensors may include an input surface that is light transmissible or at least partially light transmissible for the optical sensors to detect objects in close proximity and/or in contact with the controller. Input control sensors may also include one or more of a temperature and pressure sensors. One or more of temperature and pressure output can be used for generating an output control signal.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

FIG. 1A is a graphical representation of a game controller device according to one or more embodiments. According to embodiments, a game controller device 100 is provided including body 105 and input control sensors $\mathbf{110}_{1-n}$. Game controller device 100 is shown in a top down view in FIG. 1A. Game controller device 100 may be configured to detect user inputs for control of a game and/or interactive entertainment device and to output control signals. According to embodiments, game control device 100 may include one or more input control sensors $\mathbf{110}_{1-n}$ configured to provide surfaces a user can interact with. According to embodiments, input control sensors $\mathbf{110}_{1-n}$ may include a surface and one or more optical sensors to detect user contact (e.g., user finger, hand, etc.) with a surface. According to embodiments, user contact with the input surface can provide one or more game controller functions, including but not limited to a game control element, function triggered by a button press, multiple button press, directional pad input, joystick input, swipe input, tap input, pinch and game control input in general. FIG. 1A illustrates input control sensors $\mathbf{110}_{1-n}$ as being on a top surface, although it should be appreciated that game controller 100 can include additional game control surfaces. In addition, input control sensors $\mathbf{110}_{1-n}$ may be provided on other shapes and body configurations. FIG. 1A illustrates game controller 100 as a dual handle configuration, with input control sensors $\mathbf{110}_{1-n}$ on left and right sides for left and right hand operation. It should be appreciated that the shape or profile of input control sensors $\mathbf{110}_{1-n}$ is not limited to the shape illustrated in FIG. 1A. According to embodiments, input control sensors $\mathbf{110}_{1-n}$ may include flat, curved and/or varying surface curvatures.

According to embodiments, operation of game controller device 100 may include a user contacting one or more of input control sensors $\mathbf{110}_{1-n}$. These interactions may be detected by game controller device 100 to determine or identify commands for a gaming console. According to embodiments, input control sensors $\mathbf{110}_{1-n}$ may support a plurality of input control locations. In certain configurations, game controller 100 may detect user input to input control sensors $\mathbf{110}_{1-n}$ without a reference point. By way of example, a user tapping or swiping input control sensors $\mathbf{110}_1$ may be detected and the tap, swipe or both may be communicated to a device being controlled, such as a gaming device. According to embodiments, game controller 100 may allow for input control sensors $\mathbf{110}_{1-n}$ to detect inputs and identify commands from the inputs such as a directional command or button press. Embodiments provide multiple configurations allowing for regions to be associated with a button or directional pad. In addition, configurations allow for detecting user preference or input to set a region as a button, directional pad or game control feature in general. Embodiments also include outputting a control reference to aide a user in determining input control locations.

Figure 1B:
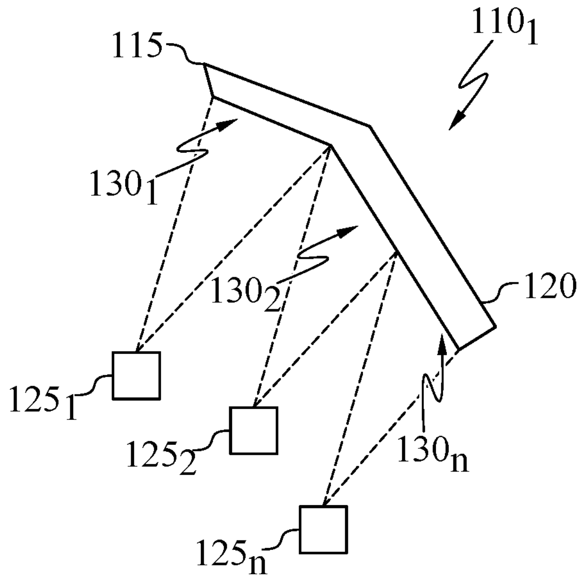
FIG. 1B is a graphical representation of an input control sensor according to one or more embodiments.
Figure 3:
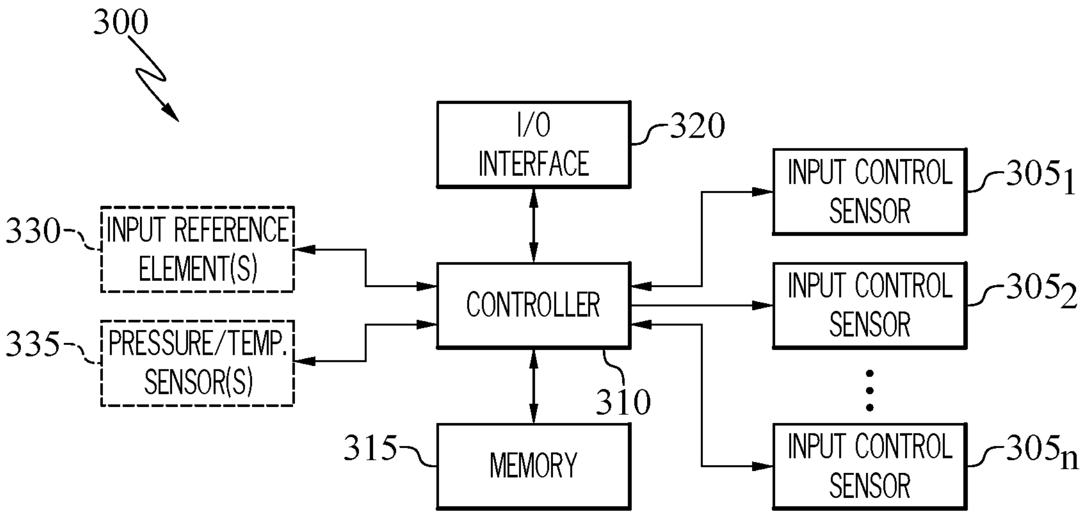
FIG. 3 illustrates a graphical representation of a game controller device configuration according to one or more embodiments.

According to embodiments, input control sensors $\mathbf{110}_{1-n}$ may be supported by body 105. Body 105 may be a plastic, a molded material or other material including one or more handles, grips or surfaces for a user to grip. Body 105 may house one or more electronics, power sources, etc. for game controller 100. Game controller may include a controller configured to detect and output input commands. FIG. 3 illustrates a configuration that may be employed by game controller 100. According to embodiments, body may be configured to support at least one input control sensor, and may include input control sensors $\mathbf{110}_{1-n}$ on one or more of top, bottom, side, front and back surfaces. Each of the input control sensors $\mathbf{110}_{1-n}$ may include an input surface and one or more optical sensors. FIG. 1B illustrates an input control sensor configuration according to one or more embodiments. The input surface may be flush and/or integrated with an outer surface of body 105. According to embodiments, each input control sensors $\mathbf{110}_{1-n}$ includes at least one optical sensor to detect game controller input to an input surface. Input control sensors $\mathbf{110}_{1-n}$ may be configured to detect at least one of touch, tap, swipe, press, pinch and joystick inputs. Commands relative to input control sensors $\mathbf{110}_{1-n}$ may be based on one or more reference points. By way of example, optical sensors may detect commands relative to a reference point to associated that command with a particular command input. Commands may be based on input control locations, the input control locations associated with a reference point to the input surface. According to embodiments, game controller 100 may optionally include one or more control inputs, such as control input 106 which may be a push button, joystick input, or other control input in general. Optional control input 106 may be supported on the outer surface of body 105.

FIG. 1B is a graphical representation of an input control sensor according to one or more embodiments. According to embodiments, an input control sensor $\mathbf{110}_1$ includes input surface 115 and a plurality of optical sensors $\mathbf{125}_{1-n}$. Input surface 115 may be an optically transmissible surface including one or more layers and elements. Input surface 115 may be formed form one or more layers of plastic or glass including one or more sensors and light emitting element. According to embodiments, input control sensor $\mathbf{110}_1$ detects user inputs to a top surface or contact surface 120 using one or more of optical sensors $\mathbf{125}_{1-n}$. Optical sensors $\mathbf{125}_{1-n}$ may each include a detection area or region, such as regions $\mathbf{130}_{1-n}$. Optical sensors $\mathbf{125}_{1-n}$ may be arranged to include a detection area for a portion of input surface 115. In response to user contact, optical sensors $\mathbf{125}_{1-n}$ may watch and track movement across a surface of a game controller. According to embodiments, an input command relative to one or more regions $\mathbf{130}_{1-n}$ may be detected by one or more of optical sensors $\mathbf{125}_{1-n}$. Output of optical sensors $\mathbf{125}_{1-n}$ may be output to a controller, such as the controller of FIG. 3. According to embodiments, user input to input surface 115 may be based on one or more reference points. By way of example, input surface 115 may include a mapping, grid or reference system including one or more reference points. Input surface 115 may associated contact with one or more reference points in a particular region as input control location. By way of example, user contact to region $\mathbf{130}_1$ may be associated with a button press, and may be detected by optical sensor $\mathbf{125}_1$. According to embodiments a portion of region $\mathbf{130}_1$ may be associated with a button press or control command. As discussed herein, a game controller may provide one or more references to notify a user of the location. Alternatively, input surface 115, at least in part or as a whole, may be used as an input surface for user actions. A user may swipe from region $\mathbf{130}_1$ to region $\mathbf{130}_2$ and then to region $\mathbf{130}_n$, in a downward motion or curving motion as an input. Optical sensors $\mathbf{125}_{1-n}$ may detect the contact and motion, and a controller may identify an output control for a game or interactive entertainment system. As discussed herein, the game controller may allow for input control locations to be set or modified by a user.

Input control sensor $110_1$ may be configured to include top surface 120 including a plurality of planar surfaces, one or more curved surfaces, and in one or more shapes. Shape and configuration of input surface 115 may be based on the outer contours of a game controller.

According to embodiments, optical sensors $125_{1-n}$ may be configured to detect touch and contact locations, contact duration, contact rate, and contact shape (e.g., swipe pattern, swipe arc, slide shape, drawn shapes, etc.). According to embodiments, input control sensor $110_1$ includes optical sensors $125_{1-n}$ configured to identify a user. User identification may be based on one or more of finger size, finger characteristics, fingerprint detection and controller grip type. Based on user identification and/or detection, a game controller may configure at least one input control location. Input control sensor $110_1$ may include one or more of a temperature and pressure senor to detect user temperature and pressure. According to embodiments, temperature and pressure sensors may be integrated within input surface 115. For example, input surface 115 may include a touch screen configuration.

Figure 2:
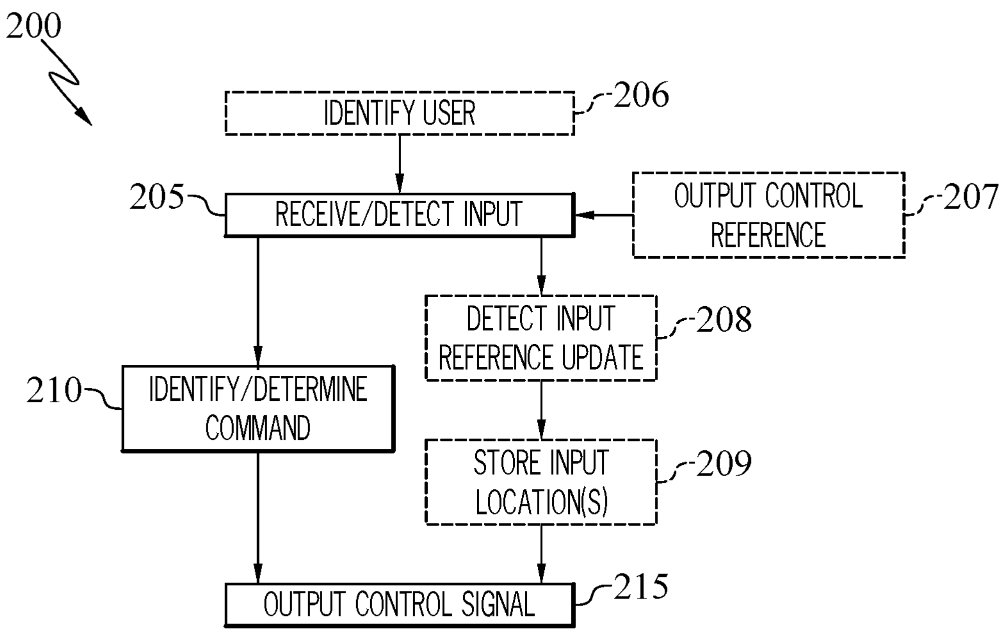
FIG. 2 illustrates a process for controller operation according to one or more embodiments.

FIG. 2 illustrates a process for controller operation according to one or more embodiments. According to embodiments, a game controller (e.g., game controller 100) can include a controller to receive input from one or more sensors, such as input control sensors $110_{1-n}$ and/or optical sensors $125_{1-n}$. Process 200 may be performed by a controller of a game controller to detect user input and output one or more commands and controls to a gaming device. Process 200 may be performed by a device, such as game controller 100 of FIG. 1, device 300 and/or controller 310 of FIG. 3. Process 200 may be initiated by a device (e.g., device 300) receiving and/or detecting input at block 205. According to embodiments, a game controller includes one or more input control sensors configured to detect user input by way of an input surface. Detecting input at block 205 can include at least one optical sensor detecting at least one of touch, tap, swipe, press, pinch and joystick inputs to an input surface. Input may be detected from one or more input control sensors by the controller. At block 205, at least one optical sensor is configured to detect input relative to at least one region of the input surface. By way of example, if a reference point is set for a user, the optical input sensor may detect input relative to one or more reference points. Block 205 can include receiving game controller inputs to one or more input control sensors. Each input control sensor may include one or more optical sensors coupled to a controller of the game controller, the game controller configured to receive optical sensor output. Detection of input may include detection of input to an input surface of an optically transmissible surface.

According to embodiments, input control sensors may detect a user finger or hand approaching the input surface, which may be a pretouch at block 205. Pretouch may be used as an input. According to embodiments, a pretouch may be detected as an input for use contact that approaches at least one region of an input surface. Alternatively or in combination, pretouch may be an input prior to engagement of a finger or user with at least one region of the input surface. Pretouch may be detected relative to input surfaces in one or more regions to provide commands from any input type prior to a user, such as a user's fingertip, contacting an input surface. Detected touch inputs and pretouch projections may be detected and stored to provide an aggregated data set for player input data. According to embodiments, pretouch data may be used to offer players an alternate or optimized input scheme. Pretouch may also offer a proximity-based input scheme that does not rely on physically touching the surface. According to embodiments, pretouch may be detected and/or sensed to track when one or more of a user's fingers are in proximity to an input surface. Pretouch may be detected to track movement of a user's finger relative to the input surface, including a pattern or movement. Systems and processes herein may be detect pretouch to allow for increased response time. By detecting pretouch, a game controller can provide an output to a gaming system or console to initiate one or more controls or processes prior to user contact.

At block 210, process includes identifying and/or determining a command. Based on received optical sensor output, a controller may identify at least one input command based on input detected for a user. Identifying of a command by the controller allows for the input control sensor and game controller to provide multiple uses of a detection area. Unlike requiring a directional pad and a joystick to allow for direction input and joystick functions in different locations, presses to an input contact location and swipes, slides or movement relative to the input control location can allow for one input control location to provide multiple functions. At block 210, a controller may identify the at least one input command relative to at least one reference point of the control sensor. An input control sensor may be configured to output a control reference or reference element to notify a user of a control location.

At block 215, the device may be configured to output a control command. Control commands may be based on user inputs or contacts detected by input control sensors. According to embodiments, a game controller can detect user inputs such as tap, touch, press, swipe, etc. and output the detected contact to a gaming device. Alternatively or in combination, a game controller can include one or more input control locations associated with regions or reference points of an input control sensor. By way of example, a directional pad may be provided by including at least four reference points, a reference point for each of up, down, left and right relative to a location of an input surface. The game controller can allow for a user to specify the location of the directional pad reference points on the input surface. According to embodiments, the game controller can provide a reference to the location of the reference points. Reference points may be provided by providing a lighted output or indication. By way of example, using one or more of back lighting and light elements of a touch screen, the location of the four reference points of the directional pad may be illuminated on a controller surface. If and when a user provides a request to modify the location of the reference points, the game controller can adjust or move the position of the directional pad components to different reference points to allow for a different input control location of the directional pad. In addition, the game controller can include reference points for a plurality of controls. By way of example, the game controller can include reference points for a directional pad, reference points for locations associated with a button or type of control input for a game (e.g., square button, X button, triangle button, plus button, home button, menu button, etc.). The game controller an output control signals based on detected and identified input commands.

Process 200 may optionally include identifying a user at block 206. According to embodiments, a game controller may be configured to detect one or more characteristics of a user and identify the user. User identification may be based on prior use, such that one or more of user hand size, grip location, fingerprints and user characteristic may be detected to identify the user. Based on a user identified at optional block 206, one or more reference points may be determined or set for determining commands at block 210.

Process 200 may optionally include outputting a control reference at block 207. According to embodiments, one or more reference points may be indicated to a user. A control reference or reference point indication may be optional, as such the controller may detect inputs to the controller based on repetitive user operation. Alternatively, the reference points or an indication of regions associated with particular commands of a controller can be provided. In the gaming space, game controllers are often tied to the gaming console or platform. As such a gaming console may include a controller with a fixed layout or fixed controls including a directional pad, often a plurality of buttons and possibly one or more joystick controls, trigger/paddle keys, menu/home button, etc. Outputting reference controls at optional block 207 can include providing one or more of a lighted indication of the control input location for each control feature. Alternatively or in combination, control references may be provided by way of a haptic or movable surface.

According to embodiments, a game controller can allow for the control input locations of game controller commands to be modified. As such, users with different hand or finger sizes can reposition the game controls to their liking. Alternatively, the modification may be based on user preference and not based on user characteristics. By way of example, a user may wish to invert the control locations and have a directional pad on the right side of a control instead of a left side, or vice versa. Process 200 may optionally include detecting a reference update at block 208 and storing one or more reference locations at optional block 209. By way of example, using a gaming console display or other game controller feature, the user can request to modify one or more game control input locations. User modification can include a request to reposition a directional pad to move down and the right, for example. According to embodiments, control input locations may be determined by a user pressing desired locations on game controller at block 208. At block 209, one or more reference points may be identified based on the updated input location and used to store one or more control input locations for a user. According to embodiments, reference updates may be determine by a game controller when a user repeatedly contacts a particular location for a feature such that the game controller can automatically perform operations at blocks 208 and 209.

FIG. 3 illustrates a graphical representation of a game controller device configuration according to one or more embodiments. According to embodiments, a game controller device can include one or more components and devices. FIG. 3 illustrates game controller device 300 according to embodiments which can include input control sensors $\mathbf{305}_{1\text{-}n}$, controller 310, memory 315 and input/output (I/O) interface 320. Game controller device 300 may be a controller for one or more of a gaming console, computing device and electronic device in general configured to output controls to the console. Game controller 300 may be integrated with a gaming device, as in the case of a handheld game console. With respect to gaming controls, game controller 300 may be configured to output controls for one or more gaming platforms. By way of example, game controller 300 may be configured for controls of a platform, such as the PlayStation® platform and include controls based on the platform (e.g., square button, X button, triangle button, plus button, home button, menu button, etc.). It should be appreciated that game controller 300 may be configured for other gaming and device platforms. Game controller 300 may include a plurality of input control sensors, and as such may include a plurality of input control sensors $\mathbf{305}_{1\text{-}n}$ for each input control sensor.

According to embodiments, game controller device 300 is configured to detect input to one or more input surfaces by input control sensors $\mathbf{305}_{1\text{-}n}$, and output control signals. Controller 310 may relate to a processor or control device configured to execute one or more operations stored in memory 315, such as processes for detecting and outputting player controls. Controller 310 may be coupled to input control sensors $\mathbf{305}_{1\text{-}n}$, memory 315, I/O interface 320. Memory 315 may be non-transitory memory configured to provide data storage and working memory operations for device 300. Memory 315 may be configured to store computer readable instructions for execution by controller 300 for one or more processes described herein. Memory 315 may also be configured to store at least one input control location. I/O interface 320 may be a communications module configured to receive and transmit data such as commands or controls to a gaming device. Game controller 300 may be configured for at least one of wired and wireless communication with a gaming console by way of I/O interface 320.

According to one embodiment, controller 310 may be configured to support a plurality of control input locations. Controller 310 may also be configured to allow a user to modify one or more control input locations. According to embodiments, game controller 300 may optionally include one or more input reference elements 330. Input reference elements 330 may include lighted elements to illuminate at least a portion of an input surface to notify a user of an input control location. In certain embodiments, input reference elements 330 may include a touch screen surface integrated with an input surface that allows to control of lighted elements. According to embodiments, Input reference elements 330 may include one or more of a haptic or deformable surface element that a user can feel the location of elements. The haptic or deformable surface may adjust its configuration such that a user could feel the input control location.

According to embodiments, game controller 300 may optionally include one or more of optional pressure and temperature sensors 335. Optional pressure and temperature sensors 335 may be configured to detect one or more of a surface temperature, user finger temperature, control temperature, and pressure applied to one or more portions of the game controller. According to embodiments, one or more of pressure and temperature detections may be used in combination with sensor output for detecting and characterizing user contact and conditions of an input surface. By combining temperature and/or pressure with contact locations, information can be provided to the gaming console with respect to the amount of force, and user condition.

Figure 4A:
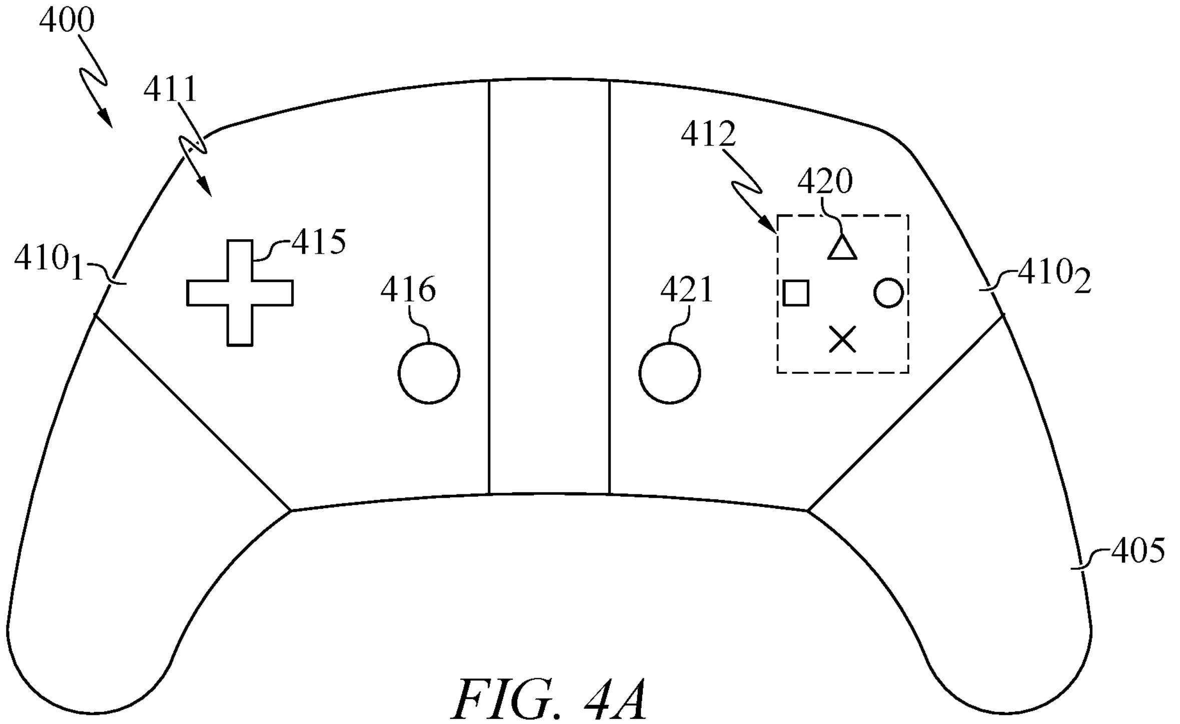
FIGS. 4A-4B illustrate graphical representations of game controller device configurations according to one or more embodiments.
Figure 4B:
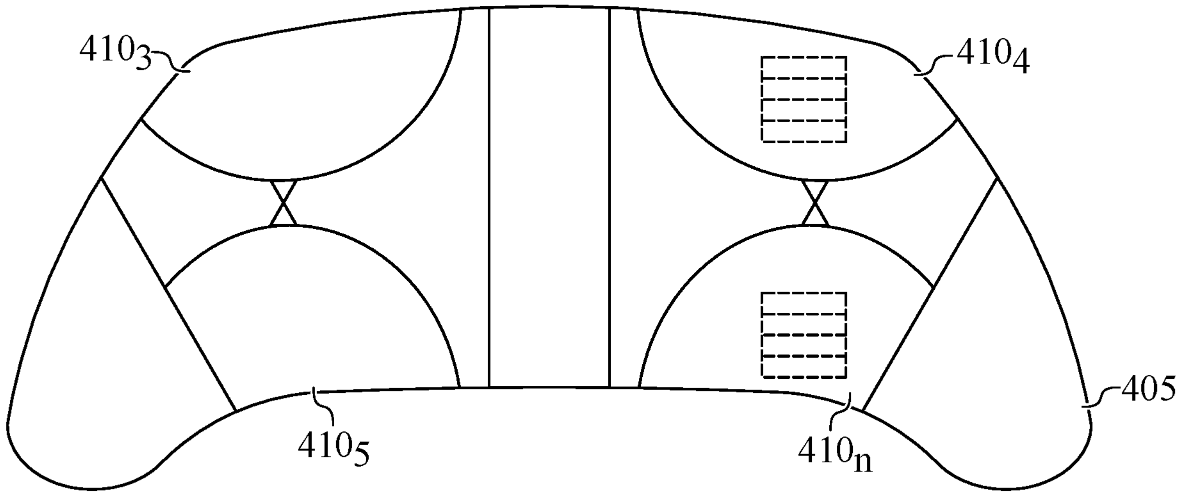

FIGS. 4A-4B illustrate graphical representations of game controller device configurations according to one or more embodiments. FIG. 4A illustrates an exemplary top down representation of game controller 400. FIG. 4B illustrates a front view of game controller 400. Game controller device 400 may incorporate one or more elements described herein including elements of game controller 100 and game controller device 300. According to embodiments, game control device 100 may include body 405 and one or more input control sensors $\mathbf{410}_{1\text{-}n}$ configured to provide surfaces a user can interact with. According to embodiments, input control sensors $\mathbf{410}_{1\text{-}n}$ may include a surface and one or more optical sensors to detect user contact (e.g., user finger, hand, etc.) with the surface. FIG. 4A illustrates an exemplary configuration including input control sensors $\mathbf{410}_{1\text{-}2}$ as being on a top surface. FIG. 4B illustrates input control sensors $\mathbf{410}_{3\text{-}n}$ as being on a front surface. FIG. 4A illustrates game controller 400 as a dual handle configuration, with input control sensors $\mathbf{410}_{1\text{-}2}$ on left and right sides for left and right hand operation. It should be appreciated that the shape or profile of input control sensors $\mathbf{410}_{1\text{-}n}$ is not limited to the shape illustrated in FIGS. 1A-1B. According to embodiments, input control sensors $\mathbf{410}_{1\text{-}n}$ may include flat, curved and/or varying surface curvatures.

FIG. 4A illustrates input control locations 411 and 412. Input control location 411 may be for left hand operation and includes input control location 415 for a directional pad and input control location 416 for a joystick controller. Input control location 412 may be for right hand operation and includes input control location 412 having a plurality of control elements, such as triangle control element 420 and input control location 416 for a joystick controller. According to embodiments, input control locations 412, 415, 416 and 421 are not physical buttons but instead areas of input control sensors $\mathbf{410}_{1\text{-}2}$ associated with a control feature. As such, a user pressing or contacting the up direction of input control location 415 would result in an up command being output by a game controller. Similarly, contact to the location associated with triangle control element 420 of input control location 412 would result in a triangle command being output by a game controller.

According to embodiments, FIG. 4A illustrates a top surface of the controller and includes a surface that incorporates input control sensors $\mathbf{410}_{1\text{-}2}$ which may include touch screens that detect both pressure and heat and that store location data for input controls. On either side of the controller, a set of optical sensors (e.g., micro cameras) may be configured to detect different zones and to look up and through a touch screen. The optical sensors can record player motion and actions, which include touch, tap, and swipe. Game controller 400 may store and aggregate the data to create areas of predicted input. According to embodiments, game controller 400 includes a controller surface to display memorized input locations, providing players a visible point of reference on the screen. Inputs can be mirrored to support player preference, creating a tailored experience for left-handed players. Game controller 400 may be configured for fingerprint recognition to ensure multiple players can use the same controller, and to offer players a personalized experience across a shared device. According to embodiments, surfaces of game controller 400 detect both pressure and heat, and are configured for mapping and storing of location data for pressure and heat. Pressure and heat sensor data may be used with optical sensors to allow for mapping player intent and to execute game commands in lieu of buttons, sticks, and triggers. Commands may be mapped and memorized to provide improved performance over time. Unique users may be 'recognized' and settings default to each individual player.

According to embodiments, game controller 400 includes at least three optical sensors (e.g., cameras) to track contact and movement across each input control sensor. Input control sensors may be configured to capture and store motion and final touch location as unique data points and to create privatized input locations. Although FIG. 4A illustrates input locations to provide players a point of reference, it should be appreciated that input locations may be modified. Based on stored reference points, players data may be used to refresh control location when a controller is used. In addition, inputs can be mirrored to support left handed play. By including input control sensors, a buttonless touch controller may be provided that does not require actual physical push buttons. Moreover, game controller 400 provides an enhanced experience for players of different hand shapes and sizes.

FIG. 4B illustrates an exemplary representation of a front surface of game controller 400. FIG. 4B illustrates input control sensors $\mathbf{410}_{3\text{-}n}$ which may each include a touch screen. Input control sensors $\mathbf{410}_{3\text{-}n}$ may detect both pressure and heat, and store location data. On either side of the front of game controller 400 may be an optical camera configuration including at least two optical sensors (e.g., micro cameras) configured to detect at least one zone or region. The optical sensors may look through a touch screen to detect and record player motion and actions, which may include touch, tap, and swipe. The data may be stored and aggregated to create areas of predicted input. Inputs can be mirrored to support player preference, creating a tailored experience for left-handed players. Input control sensors $\mathbf{410}_{3\text{-}n}$ may be configured to provide trigger locations.

Figure 5:
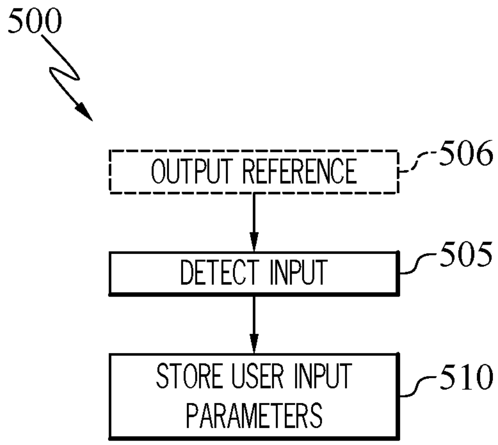
FIG. 5 illustrates a process for controller reference point determination according to one or more embodiments.

FIG. 5 illustrates a process for controller reference point determination according to one or more embodiments. Process 500 may be configured for modifying or setting user input parameters. According to embodiments a game controller may include one or more input control sensors. The input control sensors may include one or more regions for receiving input, such as a control input location. The input may be an input reference update that is a user specified location for an input control location. Process 500 allows for a game controller to modify or adjust a preset or predefined control input location. Process 500 may be initiated by detecting user input at block 505. According to embodiments, a controller may detect and record user input to set a control input location based on user detected input. Process 500 may optionally include outputting a reference at block 506 prior to detection of input at block 505. Outputting a reference At block 506 may include controlling a touch screen of an input control sensor to illuminate a portion of an input surface. A game controller may detect the user activation region relative to an output reference and/or control input location and determine the location a user with contact a game controller input sensor. At block 510 the game controller can store the control input location for a user for one or more game commands. For example, the game controller can detect input at block 515 for one or more directions of a directional pad. One or more regions of the input control sensor may be associated with the user input. These regions may be identified based on reference points associated with the sensor. The game controller can thus store control input locations in multiple areas of the control sensor. The controller may also be configured to detect input control locations based on at least one input reference update.

Figure 6:
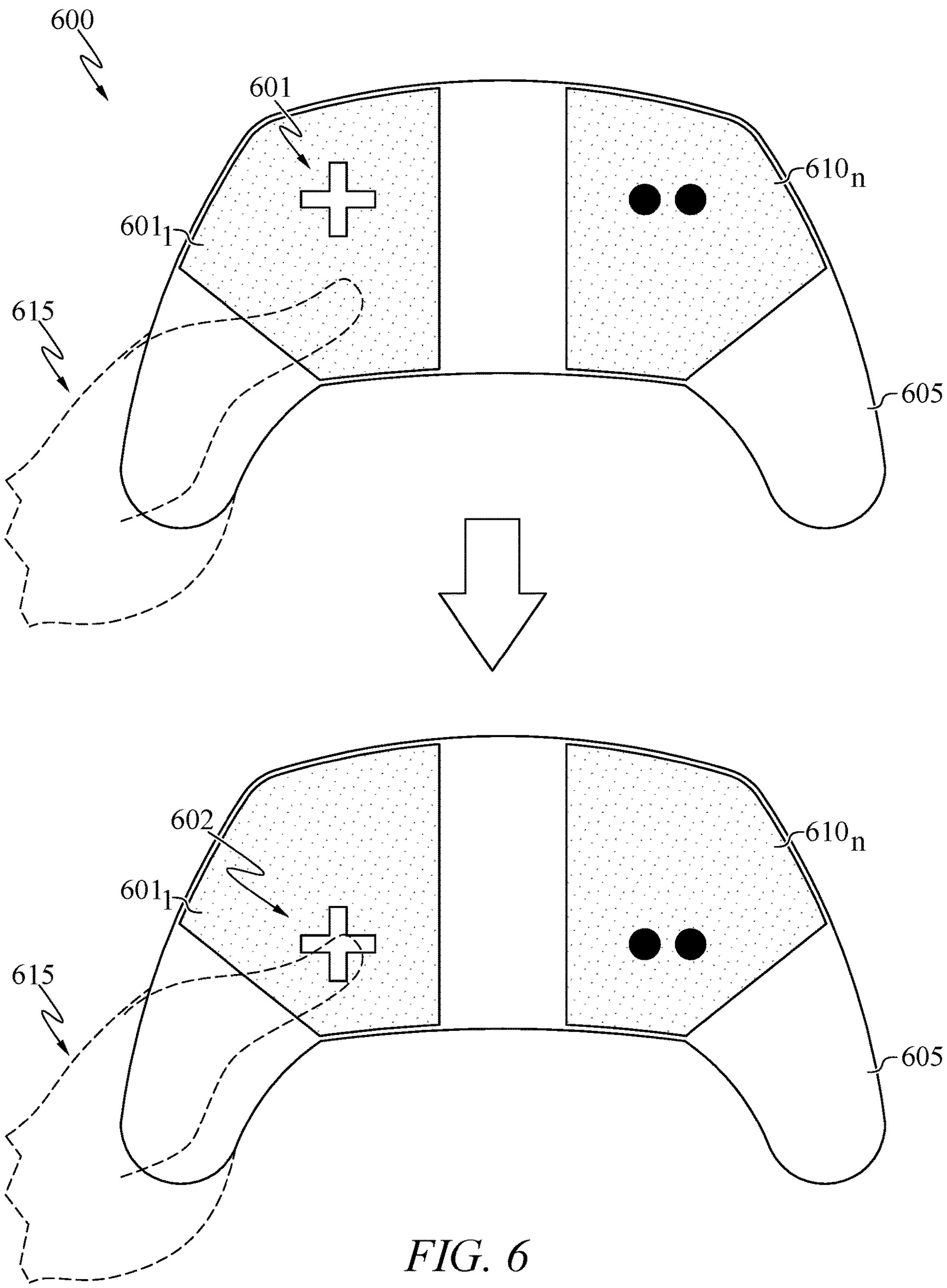
FIG. 6 illustrates a graphical representations of game controller updating according to one or more embodiments.

FIG. 6 illustrates a graphical representations of game controller updating according to one or more embodiments. Process 600 may be performed by a game controller device. Process 600 includes a game controller with body 605 and input control sensors $\mathbf{610}_{1\text{-}n}$ having control input configuration 610. Control input configuration 601 includes a directional pad provided by input control sensor $\mathbf{610}_1$ and a plurality of command elements provided by input control sensor $\mathbf{610}_n$. Game controller 600 can detect user hand 615 and when the hand contacts input control sensor $\mathbf{610}_1$. According to embodiments, game controller can detect user hand 615 for one or more of contact with input control sensor $\mathbf{610}_1$ and pretouch with an input surface or input control sensor $\mathbf{610}_1$. FIG. 6 illustrates a left hand, it should be appreciated that a right hand may also be detected.

According to embodiments, based on hand position, size, location, and/or history of placement, process 600 may include modifying the location of control input locations. FIG. 6 illustrates modification of control input configuration 601 to control input location 602 wherein directional pad provided by input control sensor 610$_1$ is moved down to be located with the users finger and modification of the position of a plurality of command elements provided by input control sensor 610$_n$. Modification of control input locations can include updated one or more reference points a controller utilizes for detection and/or sensing contact of hand position. In addition to moving control input locations, game controller updating can also include setting control input locations father apart or closer together.

Figure 7A:
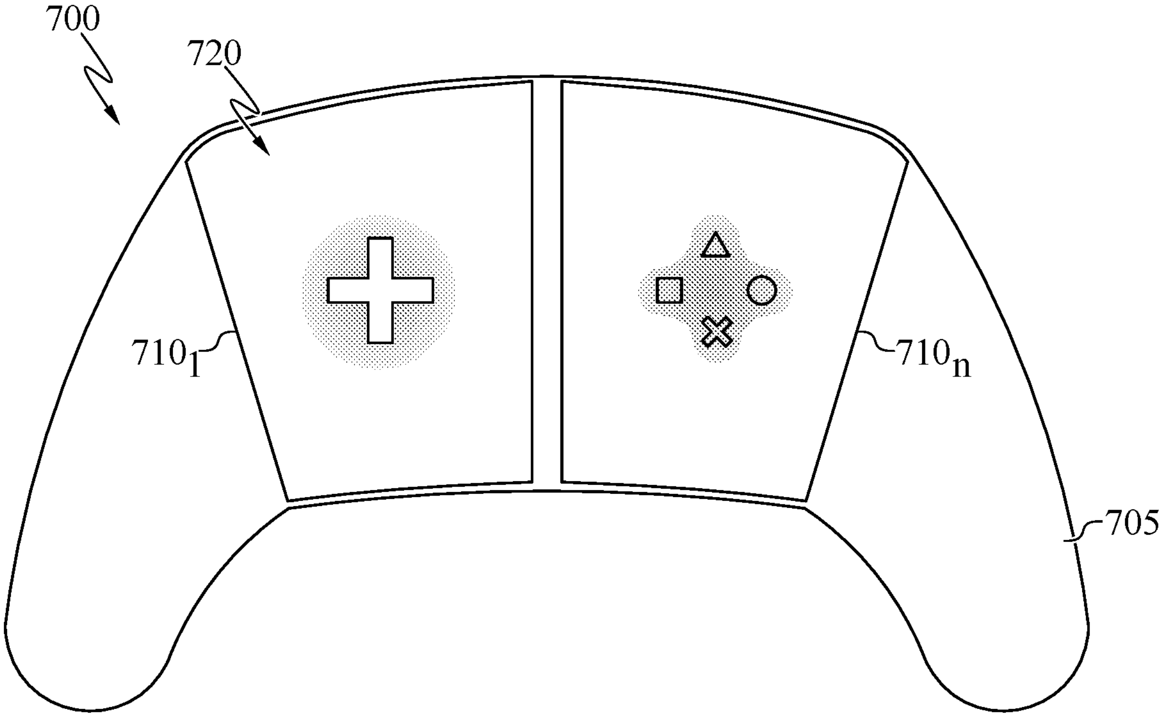
FIGS. 7A-7B illustrates a graphical representation of game controller reference points according to one or more embodiments.
Figure 7B:
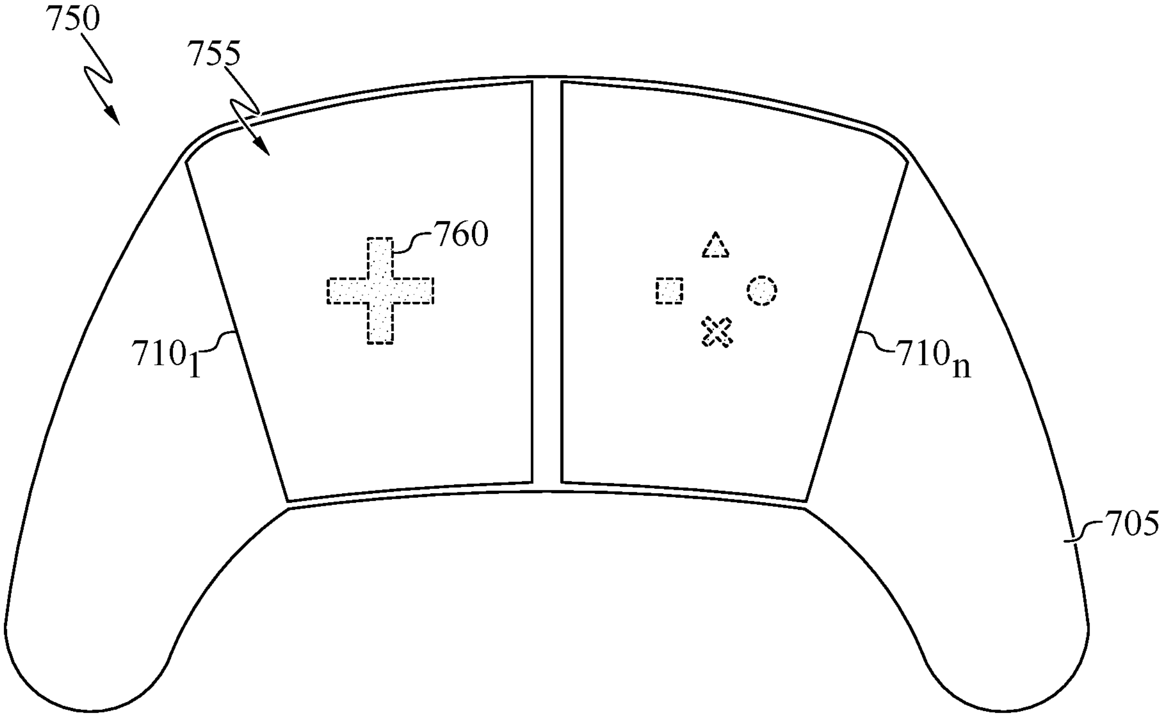

FIGS. 7A-7B illustrate graphical representations of game controller reference points according to one or more embodiments. Game controller reference points may be provided to project areas of control or control input locations and assist a user with a game control location. According to embodiments, a game controller may be configured to provide a user with the location of a control input location. FIG. 7A illustrates controller reference point configuration 700 for a game controller including body 705 and input control sensors 710$_{1-n}$. Controller reference point configuration 700 includes illumination 720 of areas surrounding control input locations including a directional pad and a plurality of command elements. According to embodiments, illumination may be provided by one or more elements of a touch screen display. Alternatively or in combination, one or more illumination elements may be located with optical sensor element to illuminate one or more portions of an input surface. FIG. 7B illustrates controller reference point configuration 750 includes illumination 755 of control input locations including a directional pad and a plurality of command elements.

Figure 8:
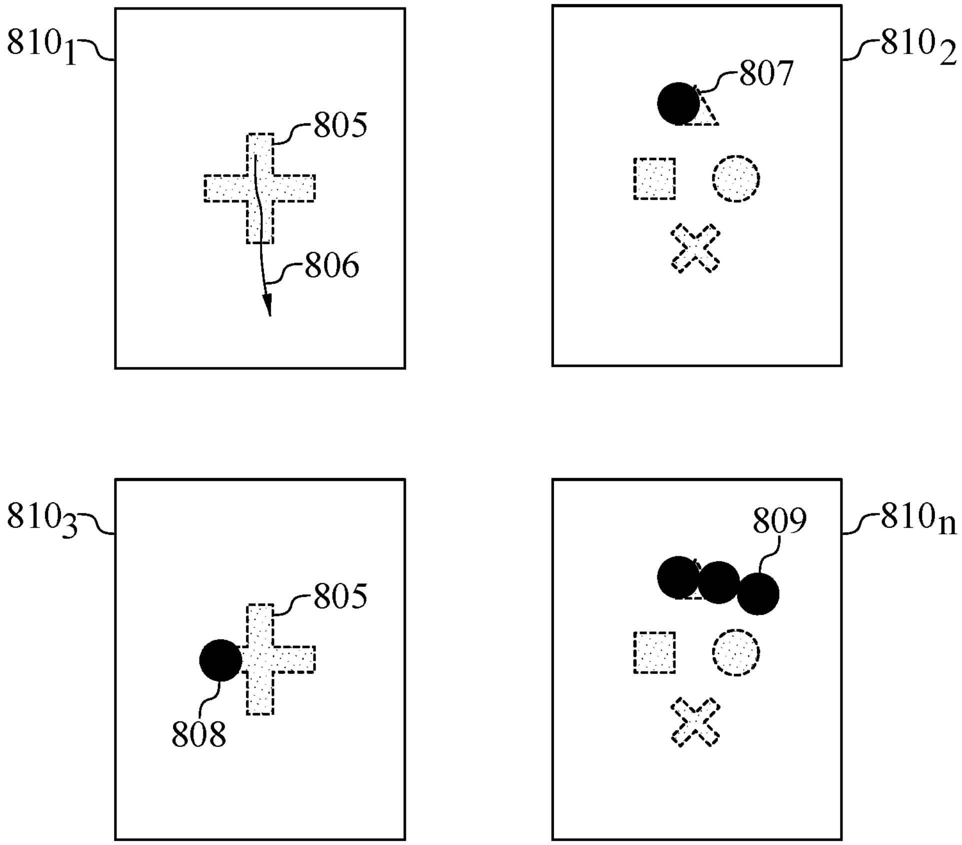
FIG. 8 illustrates a graphical representation of game controller inputs according to one or more embodiments.

FIG. 8 illustrates exemplary input to input control sensors 810$_{1-n}$ of a game controller. According to embodiments, input control sensors can detect one or more types of user interaction. Input control sensor 810$_1$ is illustrated with a control input location for a directional pad 805 and swipe input 806. Swipe input contacts the up portion of directional pad 805 and swipes down below the down direction of the directional pad 805. According to embodiments a game controller may detect the command as an up then down output to a gaming device. Input control sensor 810$_2$ is illustrated with a control input location for a plurality of control elements and press 807. Press 807 as illustrated does not entirely cover the control element, however a game controller may detect the input command based on the control input location. Input control sensor 810$_3$ is illustrated with a control input location for a directional pad 805 and press input 808. Press input 808 may result in the game controller outputting a left command for the duration that the press input 808 is held. Input control sensor 810$_n$ is illustrated with a control input location for a plurality of control elements and multiple press 809. Multiple press 809 may result in the game controller outputting a command for based on the number of presses associated with multiple press 809.

While this disclosure has been particularly shown and described with references to exemplary embodiments thereof, it will be understood by those skilled in the art that various changes in form and details may be made therein without departing from the scope of the claimed embodiments.

What is claimed is:

1. A game controller device comprising:
- a body;
- at least one input control sensor supported by the body, wherein the at least one input control sensor includes an input surface and at least one optical sensor to detect game controller input to the input surface; and
- a controller coupled to the at least one input control sensor, wherein the controller is configured to:
  - detect a user hand grip,
  - modify, based on the detected user hand grip, a control input location of the input control sensor,
  - receive game controller input at the modified control input location of the input control sensor,
  - identify at least one input command based on the input, and
  - output a control signal based on the at least one input command.

2. The game controller device of claim 1, wherein the at least one input control sensor is configured to detect at least one of touch, tap, swipe, press, pinch and joystick input.

3. The game controller device of claim 1, wherein the at least one optical sensor is configured to detect input relative to at least one region of the input surface.

4. The game controller device of claim 1, wherein the at least one optical sensor is configured to detect a pretouch relative to the input surface, wherein the pretouch is at least one of an input approaching at least one region of the input surface and an input prior to engagement with at least one region of the input surface.

5. The game controller device of claim 1, wherein the input surface includes an optically transmissible surface.

6. The game controller device of claim 1, wherein the controller identifies the at least one input command relative to at least one reference point of the control sensor.

7. The game controller device of claim 1, wherein the controller is configured to present at least one reference point for an input control location.

8. The game controller device of claim 1, wherein the controller is configured to detect input control locations based on at least one input reference update, wherein the input reference update is a user specified location for an input control location.

9. The game controller device of claim 1, wherein the controller is configured to identify a user and configure the game controller based on user identification to include at least one input control location.

10. The game controller device of claim 1, further comprising a memory coupled to the controller and configured to store executable instructions, wherein the memory is further configured to store at least one input control location.

11. The game controller device of claim 1, further comprising at least one of a temperature sensor and pressure sensor configured to detect condition of the input surface.

12. The game controller device of claim 1, wherein detecting the user hand grip comprises:
- detecting a position of the user hand grip on the game controller in a hand-held configuration, and wherein modifying the control input location of the input control sensor comprises:
- modifying the control input location of the input control sensor based on the detected position of the user hand grip on the game controller in the hand-held configuration.

13. An input control sensor for a game controller device comprising:
- an input surface;
- at least one optical sensor to detect input to the input surface; and a controller coupled to the at least one optical sensor, wherein the controller is configured to:

detect a user hand grip, modify, based on the detected user hand grip, a control input location of the input control sensor, receive input at the modified control input location of the input control sensor, identify at least one input command based on the input, and output a control signal based on the at least one input command.

14. The input control sensor of claim 13, wherein the at least one optical sensor is configured to detect at least one of touch, tap, swipe, press, pinch and joystick input.

15. The input control sensor of claim 13, wherein the at least one optical sensor is configured to detect input relative to at least one region of the input surface.

16. The input control sensor of claim 13, wherein the at least one optical sensor is configured to detect a pretouch relative to the input surface, wherein the pretouch is at least one of an input approaching at least one region of the input surface and an input prior to engagement with at least one region of the input surface.

17. The input control sensor of claim 13, wherein the input surface includes an optically transmissible surface.

18. The input control sensor of claim 13, wherein the controller identifies the at least one input command relative to at least one reference point of the control sensor.

19. The input control sensor of claim 13, wherein the controller is configured to present at least one reference point for an input control location.

20. The input control sensor of claim 13, wherein the controller is configured to detect input control locations based on at least one input reference update, wherein the input reference update is a user specified location for an input control location.

21. The input control sensor of claim 13, wherein the controller is configured to identify a user and configure a game controller based on user identification to include at least one input control location.

22. The input control sensor of claim 13, further comprising a memory coupled to the controller, the memory configured to store executable instructions and to store at least one input control location.

23. The input control sensor of claim 13, further comprising at least one of a temperature sensor and pressure sensor configured to detect condition of the input surface.

* * * * *